(12) United States Patent
Schleicher et al.

(10) Patent No.: US 9,485,914 B2
(45) Date of Patent: Nov. 8, 2016

(54) METHOD AND SYSTEM FOR SENSING A POSITION OF A VEHICLE OR GUIDING A VEHICLE WITH RESPECT TO ONE OR MORE PLANT ROWS

(71) Applicant: DEERE & COMPANY, Moline, IL (US)

(72) Inventors: Tyler D Schleicher, Ankeny, IA (US); Joshua T Lawson, Polk City, IA (US); Curtis A Maeder, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 202 days.

(21) Appl. No.: 14/291,649

(22) Filed: May 30, 2014

(65) Prior Publication Data

US 2015/0334920 A1 Nov. 26, 2015

Related U.S. Application Data

(63) Continuation-in-part of application No. 14/282,568, filed on May 20, 2014.

(51) Int. Cl.
| | |
|---|---|
| *G01B 7/30* | (2006.01) |
| *A01D 75/00* | (2006.01) |
| *G05D 1/02* | (2006.01) |
| *G07C 5/08* | (2006.01) |
| *A01B 69/04* | (2006.01) |
| *A01D 41/127* | (2006.01) |
| *A01B 15/10* | (2006.01) |

(52) U.S. Cl.
CPC .............. *A01D 75/00* (2013.01); *A01B 69/008* (2013.01); *A01D 41/1278* (2013.01); *G05D 1/021* (2013.01); *G07C 5/0841* (2013.01); *A01B 15/10* (2013.01)

(58) Field of Classification Search
CPC ....... A01D 75/00; A01D 41/127; G05D 1/02
See application file for complete search history.

(56) References Cited

U.S. PATENT DOCUMENTS

| | | | | |
|---|---|---|---|---|
| 4,967,362 | A * | 10/1990 | Schutten | A01B 69/008 56/10.2 F |
| 5,181,572 | A | 1/1993 | Andersen et al. | |
| 6,079,192 | A | 6/2000 | Rasmussen | |
| 6,176,779 | B1 * | 1/2001 | Riesterer | A01D 46/084 460/119 |
| 7,716,905 | B2 | 5/2010 | Wilcox et al. | |
| 8,924,092 | B2 * | 12/2014 | Achen | A01C 5/062 111/200 |

(Continued)

OTHER PUBLICATIONS

"Circular Buffer." Wikipedia [online article] [retrieved on Jul. 23, 2013]. Retrieved from <http://en.wikipedia.org/wiki/Circular_buffer>.

*Primary Examiner* — Huy Q Phan
*Assistant Examiner* — Alvaro Fortich

(57) ABSTRACT

A first sensor is associated with the first arm to provide a first sensor signal response indicative of a first position or first movement of the first arm with respect to the first row. A second sensor is associated with the second arm to provide a second sensor signal response indicative of a second position or second movement of the second arm with respect to the first row, or second row. A data processor is adapted to estimate a center point of the first row or a center point between the first row and the first row, or second row based on targeting substantial symmetry in the first sensor signal response and the second sensor signal response as an indication that a longitudinal axis of the vehicle is aligned with the center point, for example.

18 Claims, 13 Drawing Sheets

(56) References Cited

U.S. PATENT DOCUMENTS

| | | | |
|---|---|---|---|
| 2004/0060272 A1* | 4/2004 | De Mendonca Fava | A01D 46/28 56/10.2 R |
| 2005/0095108 A1* | 5/2005 | Hinds | B66C 23/54 414/680 |
| 2005/0197766 A1* | 9/2005 | Flann | A01B 79/005 701/533 |
| 2010/0017075 A1* | 1/2010 | Beaujot | A01B 69/008 701/50 |

\* cited by examiner

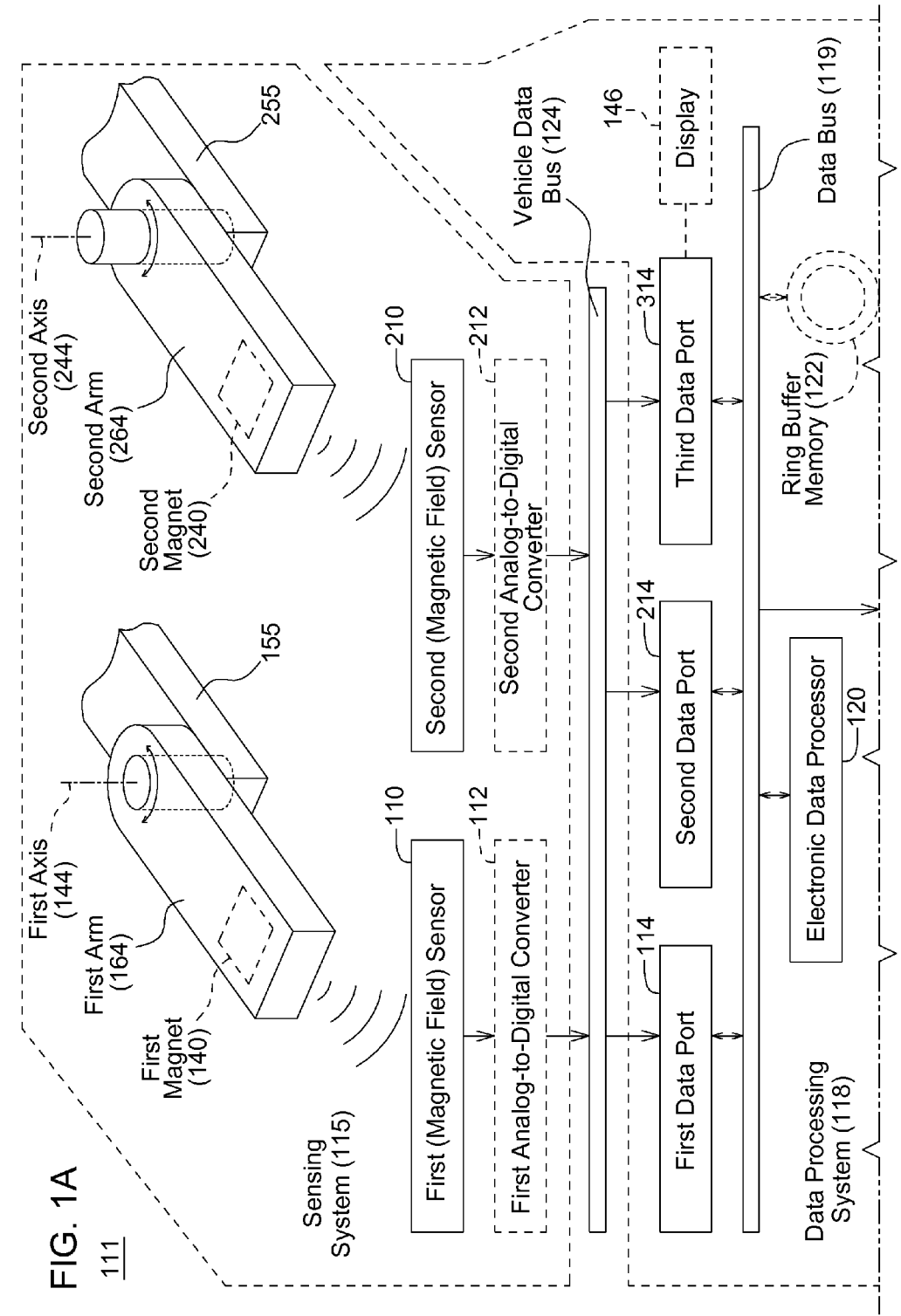

METHOD AND SYSTEM FOR SENSING A POSITION OF A VEHICLE OR GUIDING A VEHICLE WITH RESPECT TO ONE OR MORE PLANT ROWS

RELATED APPLICATION

This is a continuation-in-part of U.S. patent application Ser. No. 14/282,568, filed May 20, 2014, which is incorporated by reference into this document and application in its entirety.

FIELD

This disclosure relates to a method and system for sensing a position of a vehicle or guiding a vehicle with respect to one or more plant rows.

BACKGROUND

Prior art sensing systems with contact sensors can be used to determine the position of a vehicle (e.g., an agricultural or other off-road vehicle) or to guide the vehicle with respect to one or more plant rows. Certain prior art sensing systems may not adapt to variable row widths of a single row or variable row widths between adjacent rows or may lack the ability to determine a reliable center point between two adjacent rows. For example, if the vehicle moves or drifts toward or away from the center point, the movement or drift tends to detract from the efficiency of processing, harvesting, or treating plants in the plant rows; in some cases may lead to damage or destruction of the plants or associated root stock from compression or direct contact of the vehicle, or its tires. In other cases, the movement or drift of the vehicle may result in over application or under application of pesticides, insecticides, herbicides, fungicides or other crop treatments. Accordingly, there is need for an enhanced method and system for guiding a vehicle with respect to plant rows that facilitates estimation of a reliable center point between two adjacent rows and/or that tracks variable row widths.

SUMMARY

In accordance with one embodiment, a method or system for guiding a vehicle comprises a first arm for pivoting about a first pivot point associated with a vehicle, or its implement, in response to contact with a first row of plants (e.g., stalks). A first sensor is associated with the first arm to provide a first sensor signal response indicative of a first position or first movement of the first arm with respect to the first row. A second arm is pivotable about a second pivot point associated with a vehicle, or its implement, in response to contact with a first row, or second row of plants (e.g., stalks) spaced apart from the first row with a substantially parallel spacing. A second sensor is associated with the second arm to provide a second sensor signal response indicative of a second position or second movement of the second arm with respect to the first row, or the second row. A data processor is adapted to estimate a center point (e.g., primary center point) of the first row, or a center point (e.g., secondary center point) between the first row and the second row, based on targeting substantial symmetry in the first sensor signal response and the second sensor signal response as an indication that a longitudinal axis of the vehicle (e.g., in direction of travel) is aligned with the center point, for example.

DRAWINGS

FIG. 1 refers to FIG. 1A and FIG. 1B, collectively, and includes a block diagram of one embodiment of a system for sensing a position of a vehicle or guiding a vehicle with respect to one or more plant rows.

FIG. 2 includes a block diagram of another embodiment of a system for sensing a position of a vehicle or guiding a vehicle with respect to one or more plant rows.

DETAILED DESCRIPTION

Figure 1:
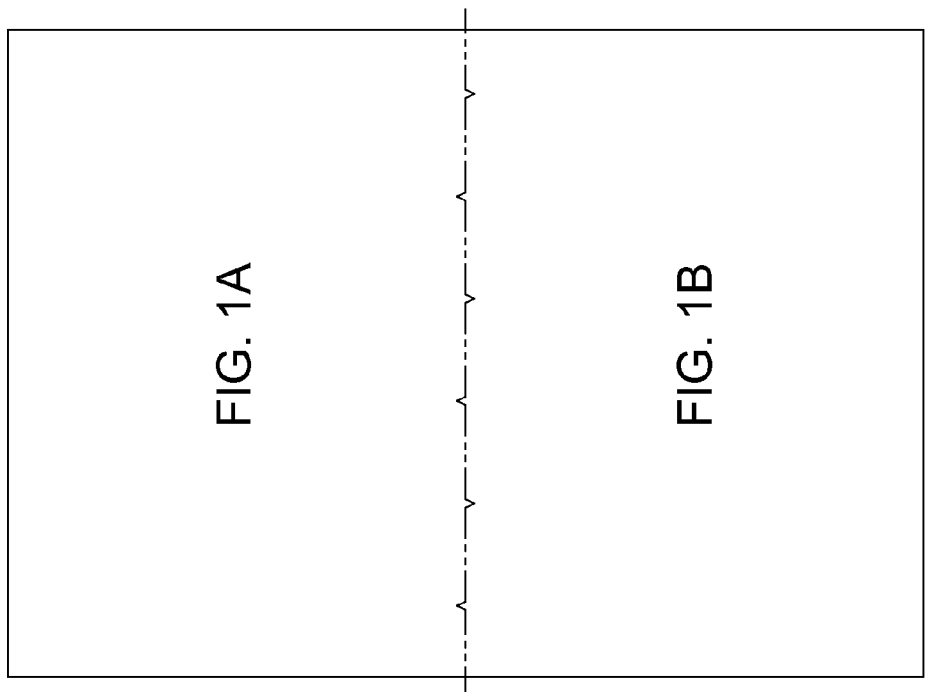
Figure 1B:
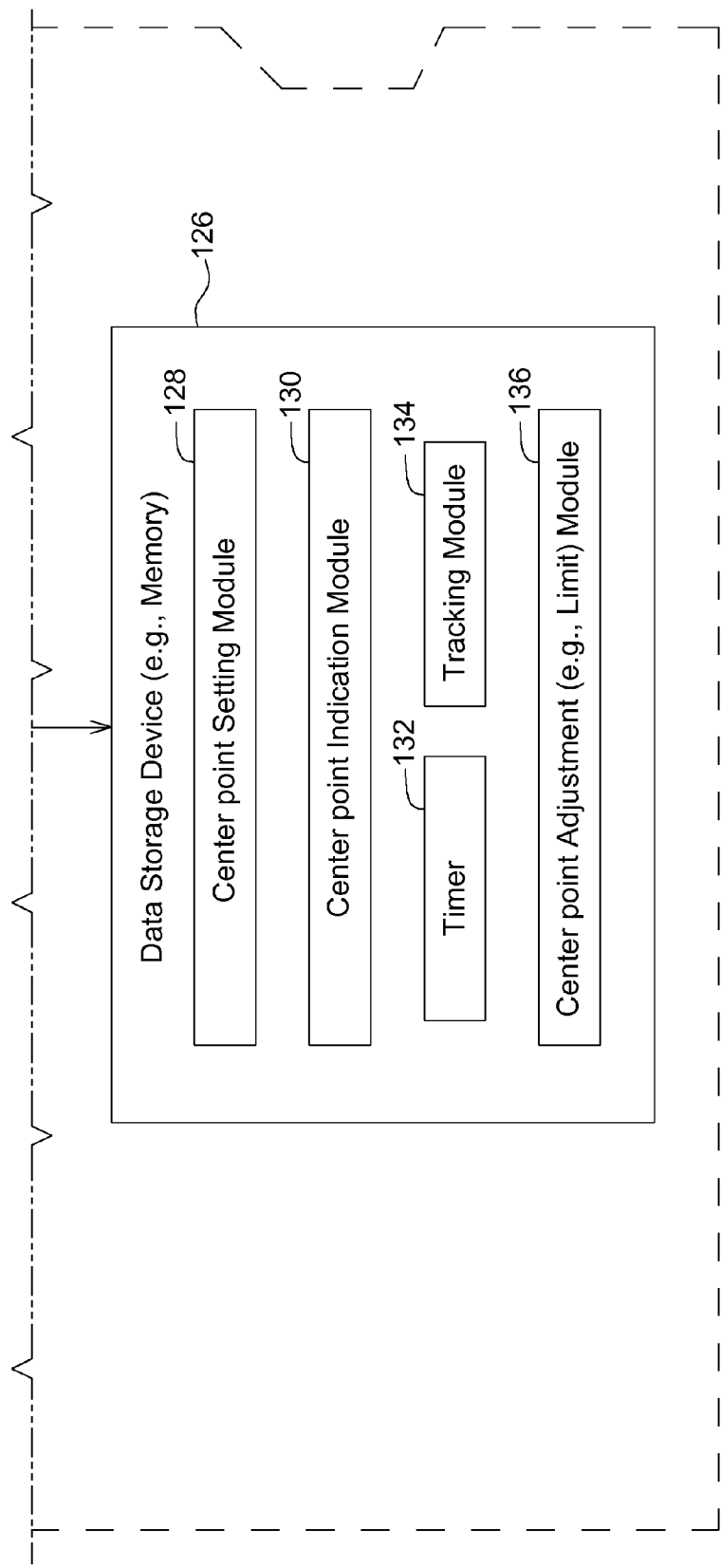

FIG. 1 refers to the combination of FIG. 1A and FIG. 1B, collectively. In accordance with one embodiment, FIG. 1 discloses a block diagram of a system 111 for sensing a position of a vehicle with respect to one or more plant rows, or guiding a vehicle with respect to one or more plant rows, or both. In one embodiment, the system 111 may comprise a sensing system 115 that is coupled to an electronic data processing system 118 via a vehicle data bus 124. Center point means a primary center point, a secondary center point, or both. A primary center point is a center point of single row or first row of plants, where the center point may be coincident with the row of plants. A secondary center point is a center point between any two adjacent rows, such as the first row and the second row. The secondary center point is not coincident with a first row or the second row of plants, but is equidistant to both the first row and the second row. Center points are distinct from central points, which will be defined later in this document.

The sensing system 115 may comprise one or more magnets (140, 240), magnetic field sensors (110, 210), and optional analog-to-digital converters (112, 212). The magnets (140, 240) are embedded in or secured to pivotable arms (164, 264) or resilient members that are configured to receive or contact one or more plants in a row during operation of a vehicle. The sensing system 115 further comprises magnetic field sensors (110, 210) that are located in proximity to the magnets (140, 240) to detect movement or rotation of the pivotable arms (164, 264) or resilient members in response to contact with, or lack thereof, with one or more plants.

In an alternate embodiment, if the magnetic field sensors (110, 210) are digital sensors that provide a digital output signal, the optional analog-to-digital converters (112, 212) may be deleted.

As illustrated in FIG. 1, a first arm 164 is pivotably mounted to a first portion 155 of a vehicle, or its implement, to rotate about a first axis 144; the second arm 264 is pivotably mounted to a second portion 255 of the vehicle, or its implement, to rotate about a second axis 244. Alternately, consistent with the illustration in FIG. 4, the first arm 164 and second arm 264 may be fixed to a portion of the vehicle or implement at an attachment point and may be formed of a flexible or resilient material that can swing, deform, rotate or move (e.g., in a generally arced path) with respect to the attachment point. In one example, the first arm 164 is arranged pivoting about a the first axis 144 or first pivot point associated with a vehicle, or its implement, in response to contact with a first row of plants (e.g., stalks); second arm 264 is arranged for pivoting about a second axis 244 or second pivot point associated with a vehicle, or its implement, in response to contact with the first row, or second row of plants (e.g., stalks) spaced apart from the first row with a substantially parallel spacing. As used herein, pivotably mounted or pivotable shall mean flexible, rotatable, elastically deformable, or hinged. The first arm 164 and the second arm 264 may be biased toward the direction of travel by a spring, resilient member or biasing member, or the first arm 164 and the second arm 264 may be formed of a resilient or elastically deformable material that is affixed at one end (e.g., to portion 155 or 255).

In one embodiment, a first magnet 140 is secured to or embedded within the first arm 164. Similarly, a second magnet 240 is secured to or embedded in the second arm 264.

A first sensor 110 (e.g., first magnetic field sensor) is arranged in proximity to the first magnet 140 to detect a first magnetic field associated with the first magnet 140 and any change in the first magnetic field associated with movement of the first magnet 140. A second sensor 210 (e.g., second magnetic field sensor) is arranged in proximity to the second magnet 240 to detect a second magnetic field associate with the second magnet 240 and any change in the second magnetic field associated with movement of the second magnet 240. The first sensor 110 and the second sensor 210 may each comprise a magnetic field sensor, such as a Hall Effect sensor, a magneto-resistive sensor, or another suitable sensor. The first sensor 110 is associated with the first arm 164 to provide a first sensor signal response indicative of a first position or first movement of the first arm 164 with respect to the first row. The second sensor 210 associated with the second arm 264 to provide a second sensor signal response indicative of a second position or second movement of the second arm 264 with respect to the first row, or second row.

In one embodiment, the first sensor 110 provides an analog first sensor signal response to a first analog-to-digital converter 112 that converts the first sensor signal response to a digital first sensor signal response. In one embodiment, the second sensor 210 provides an analog second sensor signal response to a second analog-to-digital converter 212 that converts the second sensor signal response to a digital second sensor signal response.

In one configuration, the sensing system 115 communicates with the data processing system 118 via a vehicle data bus 124. For example, the vehicle data bus 124 may comprise a Controller Area Network (CAN) data bus, an ISO (International Standards Organization 11783) data bus, Ethernet, or another communications bus.

The data processing system 118 comprises one or more data ports (114, 214, 314), an electronic data processor 120, a data storage device 126, and ring buffer memory 122 coupled to a data bus 119.

In one embodiment, the first sensor 110 (e.g., first magnetic field sensor) or the first analog-to-digital converter 112 provides the digital first sensor signal response to a first data port 114. The second analog-to-digital converter 212 or digital second sensor 210 (e.g., second magnetic field sensor) provides the digital second sensor signal response to a second data port 214. In turn, the first data port 114 and the second data port 214 are coupled to the data bus 119. An electronic data processor 120, the data storage device 126, the ring buffer memory 122, the first data port 114, the second data port 214 and a third data port 314 are coupled to the data bus 119. The electronic data processor 120 may communicate with one or more of the following via the data bus 119: the data storage device 126, the ring buffer memory 122, the first data port 114, the second data port 214 and a third data port 314.

An optional display 146, illustrated in dashed lines, may be coupled to the third data port 314 or to the vehicle data bus 124. The optional display 146 supports providing feedback in visual, graphical, textual or other form to an operator of the vehicle. For example, the optional display supports providing alignment or guidance feedback for setting or adjusting a center point alignment of the vehicle or implement with respect to a longitudinal axis of the vehicle in visual, graphical, textual or other form to an operator of the vehicle. Positional error estimates are transmitted to the steering controller 148 to control vehicle motion and to the display 146 to alert the operator about any upcoming change in vehicle motion or behavior.

The data processor 120 is programmed or adapted to estimate a center point of the first row, or a center point between the first row and the second row based on targeting substantial symmetry in the first sensor signal response and the second sensor signal response as an indication that a longitudinal axis of the vehicle (e.g., in direction of travel) is aligned with the center point.

The substantial symmetry can be based on various techniques that may be applied separately, or cumulatively. Under a first technique, the data processor 120 determines substantial similarity based on a voltage or current amplitude of the signals within a first range of each other. Under a second technique, the data processor 120 determines substantial symmetry based on a frequency of the signals within a second range of each other. Under a third technique, the data processor 120 determines substantial symmetry based on amplitude and frequency of the signals being within certain ranges or tolerances of each other.

Under a fourth technique, the data processor 120 determines substantial symmetry by subtracting the first sensor signal response from the second sensor signal response to determine an observed symmetry error signal. If the observed symmetry error signal is less than a threshold, then substantial symmetry is present. However, if the observed symmetry error signal is greater than or equal to the threshold, substantial symmetry is not present. Under the fourth technique, the first sensor signal response and the second sensor signal response may be associated with a single row of plants, with adjacent rows of plants, or with different rows of plants. The fourth technique is typically used when both the first sensor and the second sensor engage the first row of plants or when the first sensor and the second sensor engage the first and second rows of plants, where the first and second rows are adjacent.

The data storage device 126 may comprise software modules or software instructions for execution by the data processor 120 to facilitate one or more of the following: a center point setting module 128, a center point indication module 130, a timer 132, a tracking module 134 and a center point adjustment (e.g., limit) module 136. A center point setting module 128 is arranged for an operator to establish an initial center point of a single row (e.g., a first row or a second row) or an initial center point between the two rows that is later superseded by a next center point based on a center point adjustment to the initial center point or previous center point to reduce or minimize a nonsymmetrical error associated with the first signal response and the second signal response.

A center point indication module 130 is arranged for indicating or sending indication data to a display 146 that the first arm 164 and the second arm 264 are engaged with the first row of plants, or that the first arm 164 and the second arm 264 are engaged with a first row and a second row of plants, wherein the center point indication module 130 sends a setting mode enable signal to the center point setting module 128. A timer 132 is adapted to detect a time period that the first arm 164 and the second arm 264 are engaged with the first row, or a first row and a second row, or the duration of the setting mode enable signal. The center point setting module 128 is arranged to establish or lock in the initial center point after the lapse of the time period.

A tracking module 134 is adapted to determine a difference or error signal between the initial center point and an observed center point to generate a steering command to reduce or drive the difference to substantially zero. A center point adjustment module 136 may comprise a limit module that is arranged for limiting an adjustment to the initial center point to a maximum deviation or maximum limit of distance adjustment (e.g., vector length) per unit time.

Figure 2:
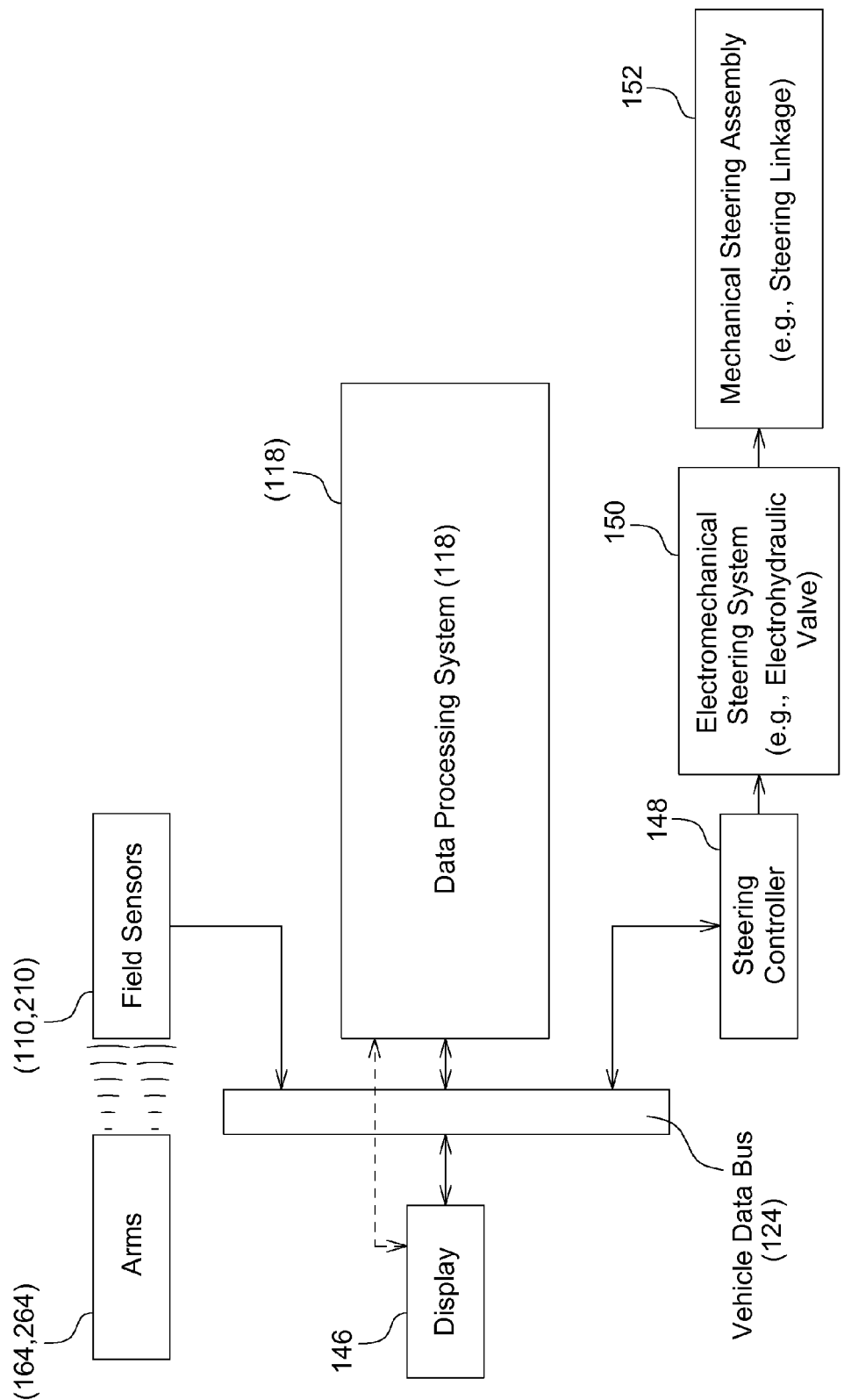

The block diagram of FIG. 2 is similar to the block diagram of FIG. 1, except the block diagram of FIG. 2 further comprises a steering controller 148, an electrohydraulic valve and a mechanical steering assembly 152. Like reference numbers in FIG. 1 and FIG. 2 indicate like elements.

The steering controller 148 is coupled to the vehicle data bus 124. In turn, the steering controller 148 sends a steering control signal or control data to an electromechanical steering system 150 (e.g., electrohydraulic valve). For example, the electromechanical steering system 150 may comprise an electrohydraulic valve, where one or more hydraulic valves are controlled by an input signal to steer or direct the wheels of a vehicle through a mechanical steering assembly 152. The electromechanical steering system 150 (or shafts associated with one or more electrohydraulic valves) control a mechanical steering assembly 152 (e.g., steering linkage). The mechanical steering assembly 152 may comprise a rack-and-pinion steering assembly, pitman arms, gears, rods, or another steering linkage that is associated with one or more wheels of the vehicle or tracks.

In an alternative arrangement, the mechanical steering assembly may use differential application of torque to wheels to steer the vehicle. Allow single-sensor mode of operation through the use of a Target voltage (Center-Point).

Referring to FIG. 1 and FIG. 2 together, the center point tracking module 134 or data processor 120 can be used to determine steering tracking data or steering adjustment data (e.g., direction and magnitude of steering) for the steering controller 148 when one or more arms (164, 264) are engaged in the crop or row. For example, a recent amplitude reading (e.g., voltage or current reading) of the first sensor signal by the first sensor 110 or the second sensor signal by the second sensor 210 is subtracted from the respective central point reference amplitude reading (e.g., peak amplitude) to determine the magnitude and direction of error (e.g., steering error or adjustment data to the center point). In one embodiment, a central point for each sensor (e.g., first sensor 110 and the second sensor 210, or left and right sensors) is set anew for each pass of the vehicle down a row. The data processor 120 or center point adjustment module 136 adjusts (e.g., slowly or in conformance with a limit per unit time) the central points of the sensors (110, 210) or adjusts (e.g., slowly or in conformance with a limit per unit time) the center point to address or handle changes in crop width, un-equal mud build-up, down stalk or cane, paddle deformations, or other biasing issues. The data processor 120, tracking module 134, center point setting module 128, center point adjustment module 136 or fusion arbitration module (e.g., left right fusion arbitration module) may determine a center point of a single row (e.g., coincident with a row of plants) or the center point between the first and second row (or adjacent rows), based on evaluation (e.g., symmetry evaluation) of one or more first central points for a first sensor and one or more second central points for a second sensor. In the evaluation (e.g., symmetry evaluation), the data processor 120 may subtract the first sensor signal response and the second sensor signal response for a sampling period to determine an observed symmetry error. Further, the observed symmetry error may comprise a mean error, mode error, median error, average error, arithmetic mean error, or weighted average error (e.g., time weighted average) for comparison to a threshold error to determine whether the observed symmetry error is material and exceeds the threshold error. The tracking module 134 or data processor 120 determines whether or not the longitudinal axis of the vehicle is aligned with the center point of a single row (e.g., coincident with a row of plants) or the center point between the first and second row (or adjacent rows of plants) if the observed symmetry error is less than the threshold error. The tracking module 134 or data processor 120 determine that the longitudinal axis of the vehicle is not aligned with the center point if the observed symmetry error is greater than or equal to the threshold error, for example. The data processor 120 can use a material observed symmetry error to estimate, determine or adjust the center point of a first row, or between a first row and a second row. The data processor 120 enables the center point setting module 128 to set an initial center point for the steering controller 148 when the vehicle is aligned with one or more rows via an auto-steering or a satellite navigation system (e.g., Global Positioning Receiver with differential correction receiver).

Figure 3:
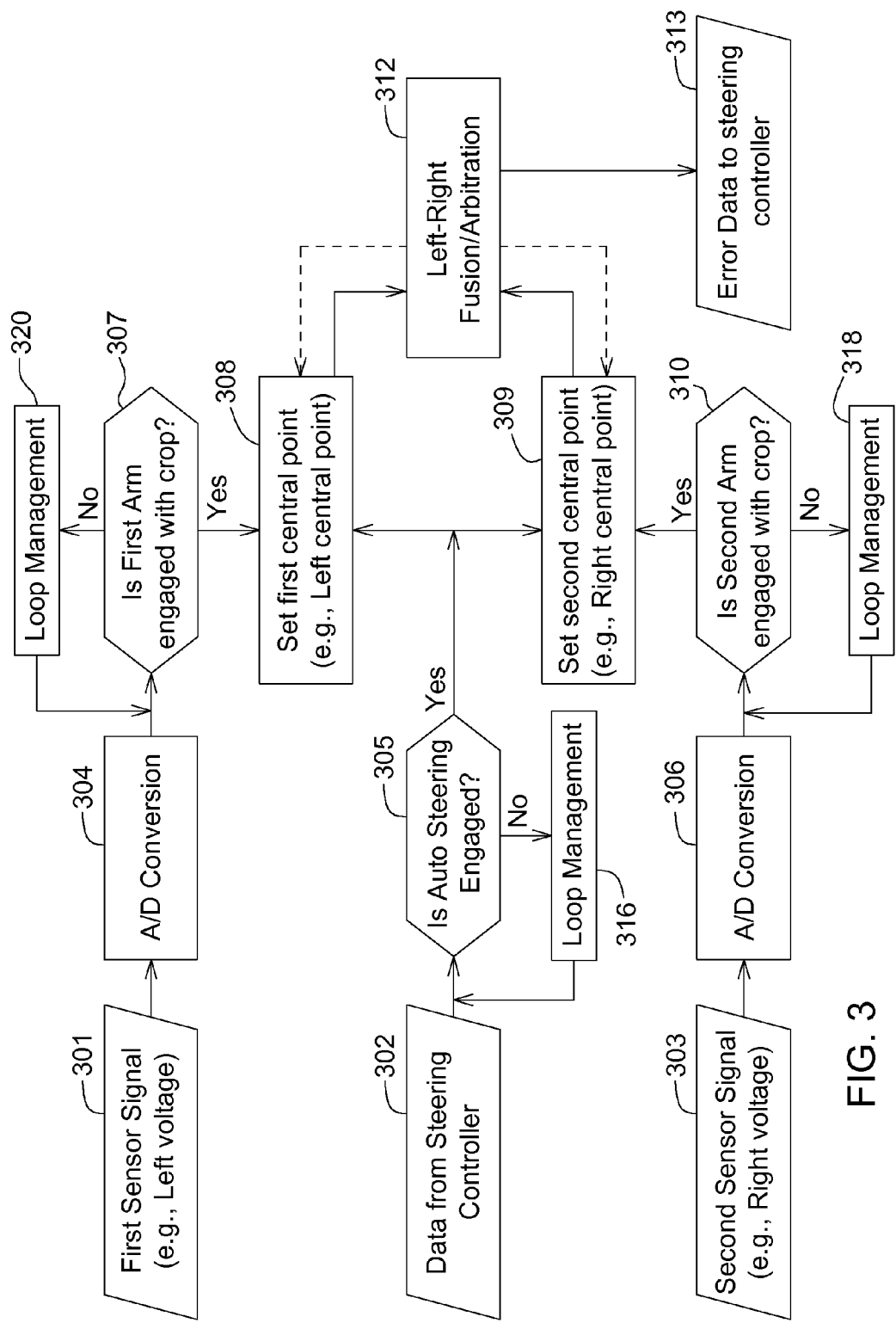
FIG. 3 is a flow chart of a method for sensing a position of a vehicle or guiding a vehicle with respect to one or more plant rows.

FIG. 3 is a flow chart of a method for sensing a position of a vehicle or guiding a vehicle with respect to one or more plant rows.

In block 301, a first sensor signal from the first sensor 110 is applied to analog-to-digital conversion in block 304. In turn, the output of the analog-to-digital conversion in block 304 is fed into a first decision block 307. In the first decision block 307, the data processor 120 determines whether or not the first arm 164 is engaged with a plant or row of plants of a crop. For example, if the first arm 164 is engaged with a row or plant, the first arm 164 provides a first signal response that is greater than or equal to a threshold signal or reference signal. If the first arm 164 is engaged with the crop, the method continues with block 308 in which the data processor 120 sets a first central point for the first arm 164. However, if the first arm 164 is not engaged with a plant or row of crop, then the method continues with block 320.

The first central point is not a center point of a single row of crop or a center point between adjacent rows of the crop. Instead, the first central point indicates orientation of the first arm 164 where the resultant first sensor signal is at a substantial peak or local maxima amplitude for one or more sampling periods. The substantial peak or local maxima amplitude may be determined based on root mean squared measurement of the first sensor signal or a peak amplitude detector of the resultant first sensor signal, for example.

In block 320, loop management waits for a time interval, increases a count of the counter and determines whether the counter is less than a maximum count. If the counter is less than a maximum count or until a maximum count is reached or the data processor 120 is reset, block 307 is executed after expiration of the time interval.

In block 303, a second sensor signal from the second sensor 210 is applied to analog-to-digital conversion in block 306. In turn, the output of the analog-to-digital conversion is fed into a second decision block 310. In the second decision block 310, the data processor 120 determines whether or not the second arm 264 is engaged with a crop. For example, if the second arm 264 is engaged with a row of plants or a plant of crop, the second arm 264 provides a second signal response that is greater than or equal to a threshold signal or reference signal. If the second arm 264 is engaged with the crop, the method continues with block 309 in which the data processor 120 sets a second central point for the second arm 264. However, if the second arm 264 is not engaged with a plant or row of crop, then the method continues with block 318.

The second central point is not a center point between adjacent rows of the crop. Instead, the second central point indicates orientation of the second arm 264 where the resultant second sensor 210 signal is at a substantial peak or local maxima amplitude for one or more sampling periods. The substantial peak or local maxima amplitude may be determined based on root mean squared measurement of the second sensor 210 signal or a peak amplitude detector of the resultant second sensor 210 signal, for example.

In block 318, loop management waits for a time interval, increases a count of the counter and determines whether the counter is less than a maximum count. If the counter is less than a maximum count or until a maximum count is reached or until the data processor 120 is reset, block 310 is executed after expiration of the time interval.

In block 302, data from the steering controller 148 provides a signal indicative of whether automatic steering is active or engaged, such as via a satellite navigation receiver signal and an associated navigation system or guidance system. If the data processor 120 determines that autosteering is active or engaged, the method continues with blocks 308 and 309 to enable the setting of the first central point and the second central point, where the first central point and the second central point are made available or provided to the left-right fusion/arbitration in block 312. The left-right fusion/arbitration in block 312 may measure a symmetry between the first sensor signal and the second sensor signal over time to track shifts in a center point of a single row of plants or between adjacent rows of plants of a crop. If the data processor 120 determines that the autosteering is inactive or not engaged, the method continues with block 316. The left-right fusion/arbitration of block 312 outputs error data for the steering controller 148. In one embodiment, the error data may comprise a difference between an amplitude of the first sensor signal and the second sensor signal during one or more sampling periods. In an alternate embodiment, the left-right fusion/arbitration of block 312 may output adjustment data to adjust the first central point, the second central point, or both based on the error data or central point error data. The central point error data can be based on a difference between the first central point and a reference first central point associated with a peak amplitude or reference amplitude. Similarly, the central point error data can be based on a difference between the second central point and a reference second central point associated with a peak amplitude or reference amplitude.

In block 316, loop management waits for a time interval, increases a count of the counter and determines whether the counter is less than a maximum count. If the counter is less than a maximum count or until a maximum count is reached or until the data processor 120 is reset, block 305 is executed after expiration of the time interval.

Figure 4:
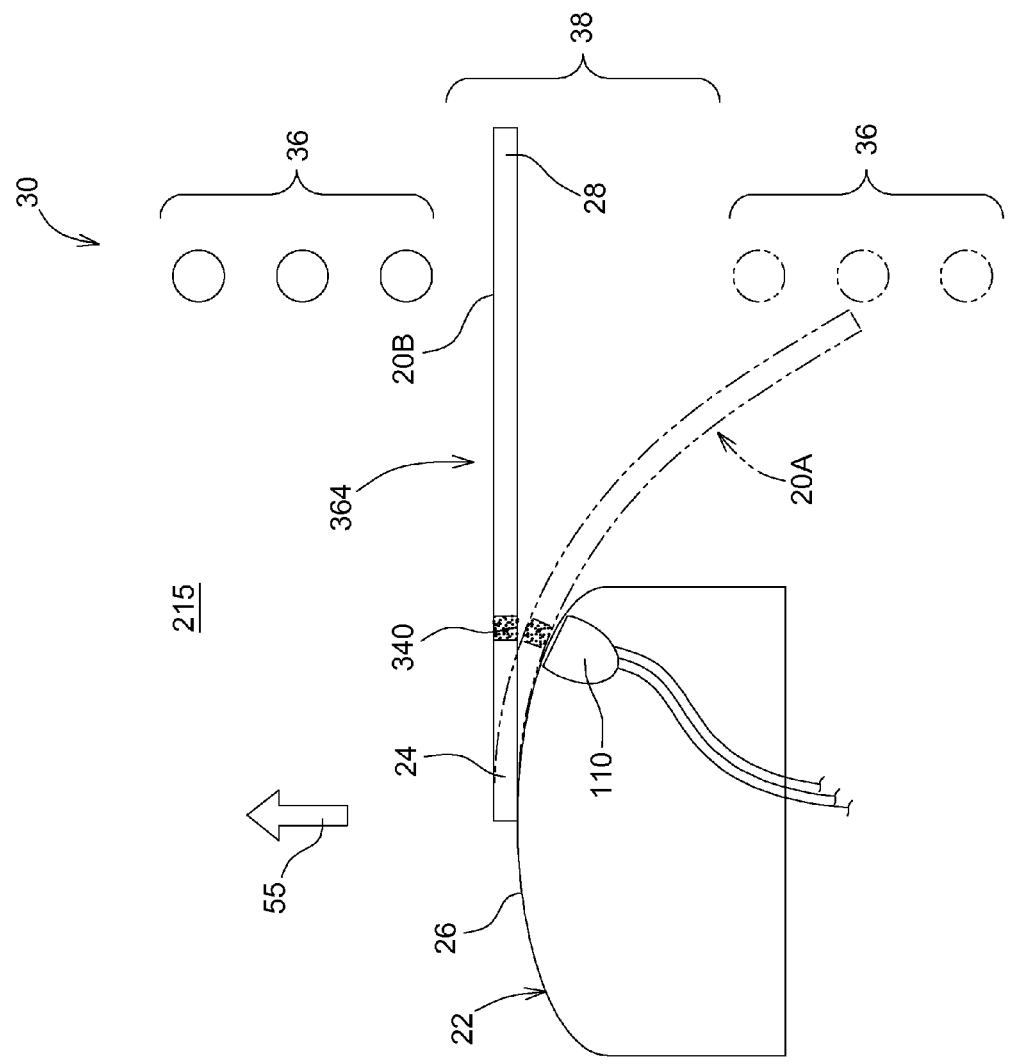
FIG. 4 is a plan view of one embodiment of a sensing assembly which is mounted to an implement or header of a harvesting vehicle.

FIG. 4 is a plan view of one illustrative embodiment of portion of a sensing system 215 which is mounted to a vehicle, or its header, or its implement. Like reference numbers in FIG. 1 and FIG. 4 indicate like elements.

Although only single row sensing system 215 is shown in FIG. 4 with a first arm 364, the sensing system could be configured to include a second arm, second magnet, and associated second sensor similar to the configuration illustrated in FIG. 1. The sensing system 215 of FIG. 4 may replace or be substituted for all or part of the sensing system 115 of FIG. 1, where the first arm 164 is analogous to the first arm 364, the first magnet 340 is analogous to the first magnet 140, for example. A first magnet 340 is embedded or secured in the first arm 364 or first resilient member. The first arm 364 or first resilient member may be referred to as a paddle. At least one end (e.g., second end) of the first arm 364 is pivotable, hinged, rotatable, movable, or elastically deformable with respect to the housing 22 or stationary member. A first magnetic field sensor (e.g., 110) is located in proximity to the first magnet 340 for reception of a magnetic field or change in a magnetic field from movement of the first arm 364. For example, the first magnetic field sensor is mounted in the housing 22 so that it can interact with the first magnet 340 which is attached to the first arm 364. In one embodiment, the first arm 364 has a first end 24 fixed to a surface 26 (e.g., curved surface or forward-facing surface) of the housing 22 and a second end 28 which projects into a crop row 30 or row of plants. The crop row 30 consists of a plurality of plants or crop stalks 36.

The direction of travel of the vehicle or the sensing system 215 is indicated by arrow 55. When the first arm 364 engages the crop stalks 36, it is bent in a rearward direction into a position such as 20A. When there is a gap 38 in the crop row, the first arm 364 will spring forward and bounce or oscillate until it occupies a relaxed position such as 20B. As the first arm 364 moves, the first magnet 340 moves relative to the first magnetic field sensor 110, the magnetic field sensor 110 generates a signal which has an amplitude (e.g., in current or voltage) that is a function of the distance between the magnet 340 and the first magnetic sensor 110.

Figure 5:
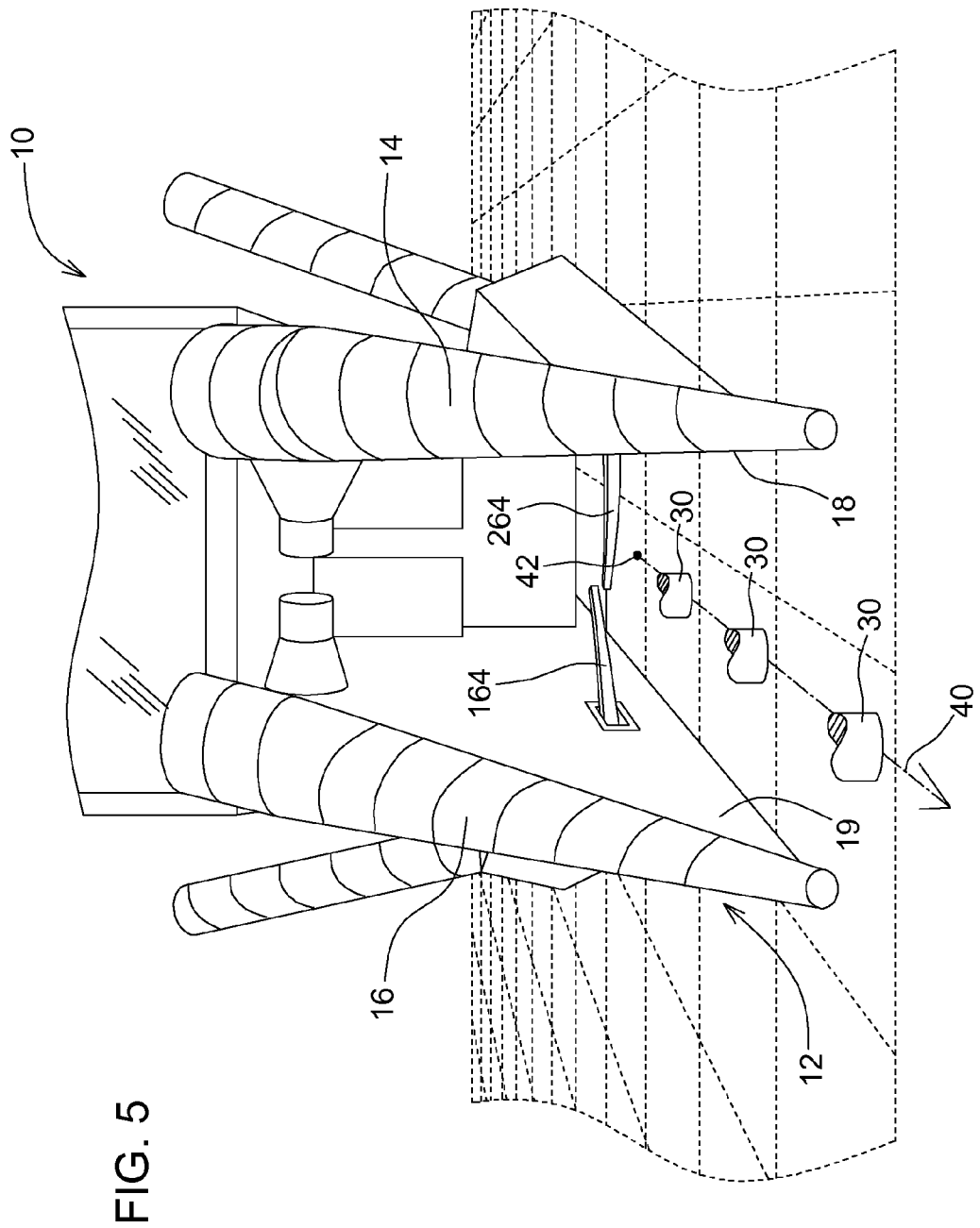
FIG. 5 is a perspective view of header (e.g., of a sugar cane harvester) that incorporates the sensing assembly of FIG. 4.

FIG. 5 is a perspective view of a sugar cane harvester 10 that incorporates the sensing system 115 of FIG. 1 or the sensing system 215 of FIG. 4. Like reference numbers in FIG. 1, FIG. 4 and FIG. 5 indicate like elements.

In one embodiment, the sensing system 115 of FIG. 1 is mounted on or associated with a header 12 of a sugar cane harvester 10. As illustrated, the sugar cane harvester 10 comprises tapered members (14, 16) associated with, or projecting forward from, a first housing section and a second housing section. In one embodiment, the tapered members (14, 16) comprise substantially conical or substantially semi-conical members. The first housing section 19 covers a portion of the first arm 164 and the first sensor 110 (e.g., first magnetic field sensor). The second housing section 18 covers a portion of the second arm 264 and the second sensor 210 (e.g., second magnetic field sensor). The sugar cane harvester 10 moves in a direction of travel (indicated by the arrow head) along a longitudinal axis 40, while harvesting sugar cane in a row of plants 30 with a center point 42 aligned with or intercepting a longitudinal axis 40 of the sugar cane harvester 10 or its header 12.

Figure 6:
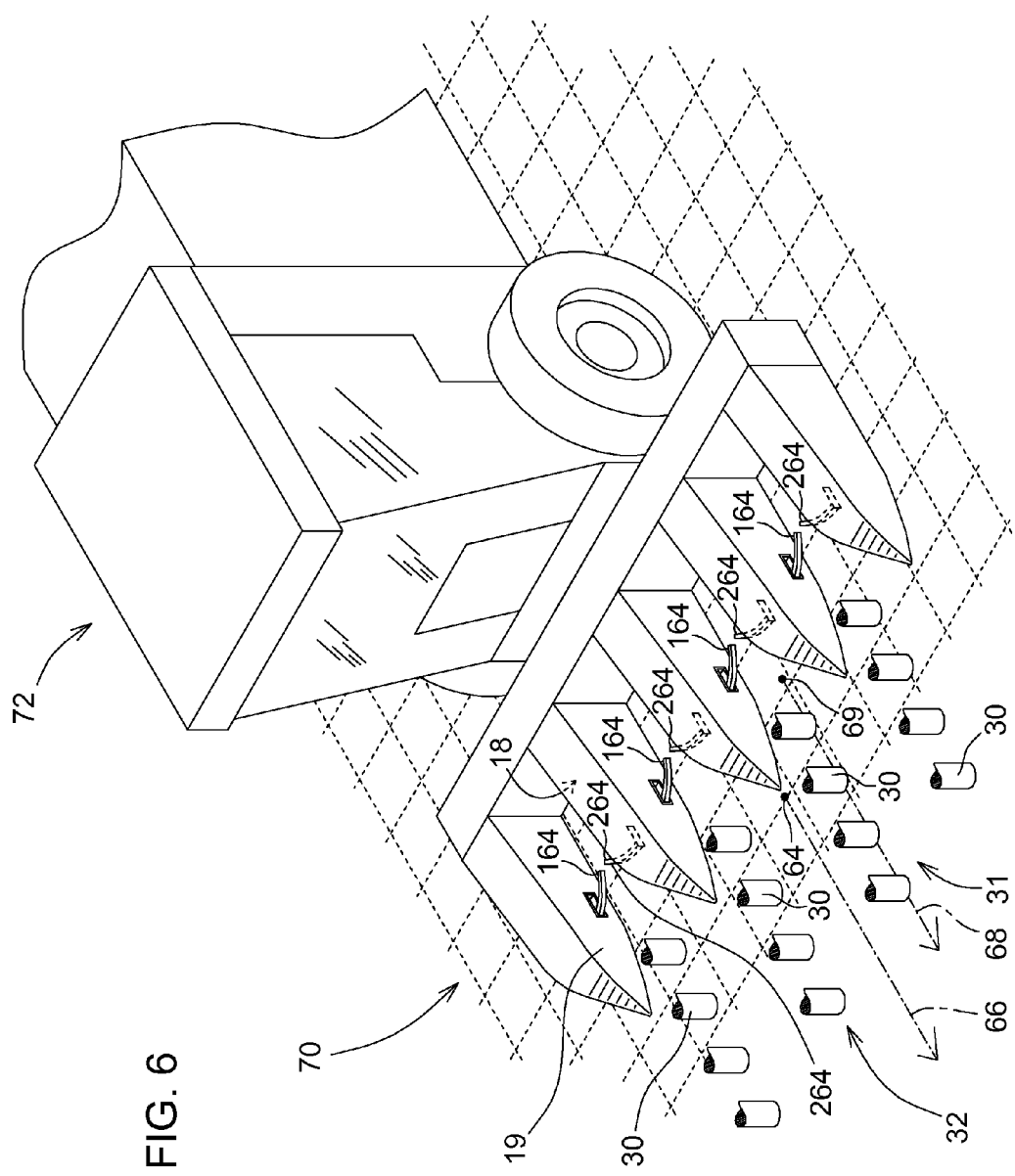
FIG. 6 is a perspective view of harvester or combine that incorporates the sensing assembly of FIG. 4, where the harvester is on a field populated with plant rows.

FIG. 6 is a perspective view of harvester 72 or combine that incorporates the sensing system 115 of FIG. 4 or of FIG. 1, where the harvester 72 is on a field populated with plant rows 30 that are generally parallel to each other. Like reference numbers in FIG. 1 and FIG. 6 indicate like elements.

The first housing section 19 covers a portion of the first arm 164 and the first sensor 110 (e.g., first magnetic field sensor). The second housing section 18 covers a portion of the second arm 264 and the second sensor 210 (e.g., second magnetic field sensor). Although the illustrated harvester 70 has a header 70 capable of harvesting simultaneously four plant rows 30, the header 70 may be configured to harvest virtually any number of plant rows 30. Although each row 30 is associated with one or more arms (164, 264) as shown, various configurations are possible. In a first configuration, a first arm 164 and a second arm 264 are associated with a first row 31 of plants 30 or a same row of plants. In a second configuration, a first arm 164 is associated with a first row 31 of plants 30 and a second arm 264 is associated with a second row 32 of plants 30. In a third configuration, the first arm 164 is associated with a different row of plants than the second row, where the different rows are substantially parallel to each other. In one embodiment, the harvester 72 or combine, or its header 70, is aligned to travel in longitudinal axis (66 or 68) in the direction of travel (indicated by the arrows extending from axes 66 or 68) such that a center point (e.g., primary center point 69) of a row is registered with, aligned to, or intercepts the longitudinal axis 68 in the direction of travel. In another embodiment, the harvester 72 or combine, or its header 70, is aligned to travel in longitudinal axis (66 or 68) in the direction of travel (indicated by the arrows extending from axes 66 or 68) such that a center point (e.g., secondary center point 64) of a row is registered with, aligned to, or intercepts the longitudinal axis 66 in the direction of travel.

Figure 7:
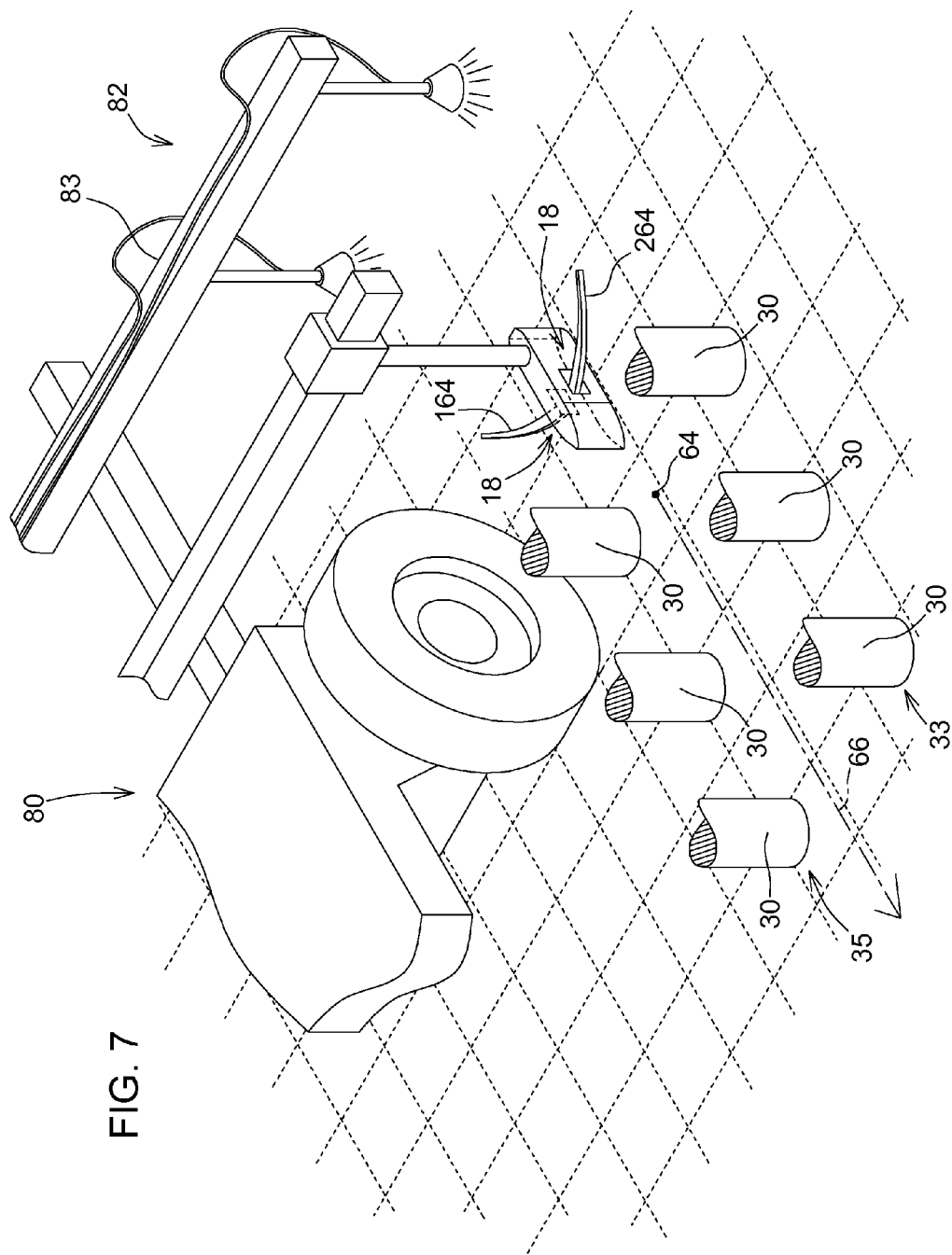
FIG. 7 is a perspective view of a sprayer implement that incorporates the sensor assembly of FIG. 5, where the sprayer implement is on a field populated with plant rows.

FIG. 7 is a perspective view of a sprayer or sprayer implement that incorporates the sensor assembly of FIG. 4 or FIG. 1 where the sprayer implement is on a field populated with plant rows. Like reference numbers in FIG. 1 and FIG. 7 indicate like elements.

A sprayer implement 80 may be pulled by a tractor or another vehicle, whereas a sprayer may be vehicle with an integral spraying or distribution apparatus 82 for agricultural inputs, such as herbicide, insecticide, fungicide, fertilizer, nitrogen, nutrients. Although the illustrated sprayer or sprayer implement 80 has a spraying boom 83 capable of spraying simultaneously two plant rows 30, the sprayer boom may be configured to spray virtually any number of plant rows 30. Although each row 30 is associated with one or more arms (164, 264) housed in housing 18 as shown, various configurations are possible. In a first configuration, a first arm 164 is associated with a first row 35 of plants and a second arm 264 is associated with a second row 33 of plants, where the first and the second rows (35, 33) are substantially parallel to each other. In a second configuration (not shown), a first arm 164 and a second arm 264 are associated with a first row (35) of plants or a same row of plants. Accordingly, the second configuration requires two separate housings (not shown, but similar to 18) spaced apart from each other to house the first arm 164 and the second arm 264. In a third configuration, the first arm 164 is associated with a different row of plants than the other row, where the different rows are substantially parallel to each other. In FIG. 6 the sprayer or the implement, is aligned to travel in longitudinal axis in the direction of travel such that a center point 64 (e.g., secondary center point) of a row is registered with, aligned to, or intercepts the longitudinal axis 66 in the direction of travel.

Figure 8:
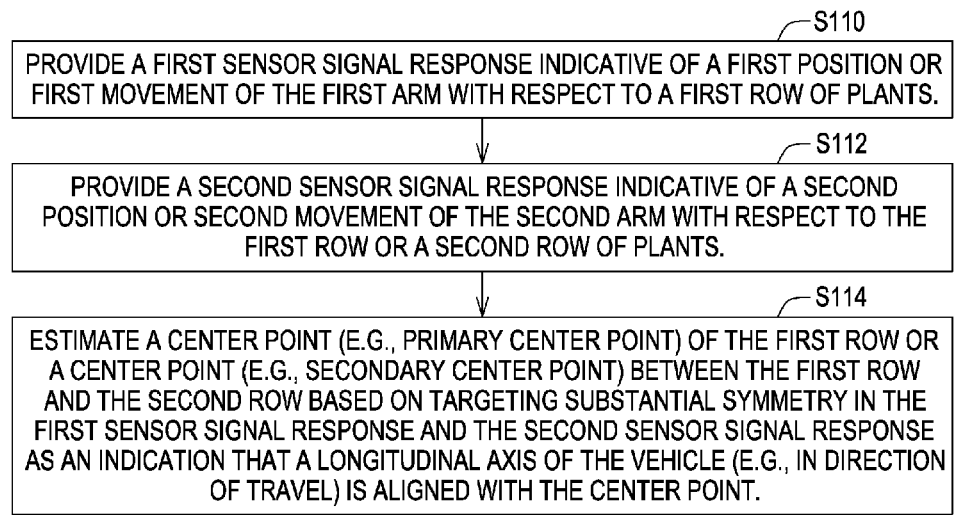
FIG. 8 is first embodiment of a method for sensing a position of a vehicle or guiding a vehicle with respect to one or more plant rows.

FIG. 8 comprises a method for sensing a position of a vehicle or guiding a vehicle with respect to one or more plant rows. The method of FIG. 8 begins in step S110.

In step S110, a first sensor 110 or first magnetic field sensor provides a first sensor signal response indicative of a first position or first movement of the first arm 164 with respect to a first row of plants. For example, the first magnetic field sensor or first sensor 110 may provide a sensor signal to first analog to digital converter that converts the sensor signal to a digital first sensor signal response.

In step S112, a second sensor 210 or second magnetic field sensor provides a second sensor signal response indicative of a second position or second movement of the second arm 264 with respect to the first row, or a second row of plants. For example, the second magnetic field sensor or second sensor 210 may provide a sensor signal to second analog to digital converter that converts the sensor signal to a digital second sensor signal response.

Figure 9:
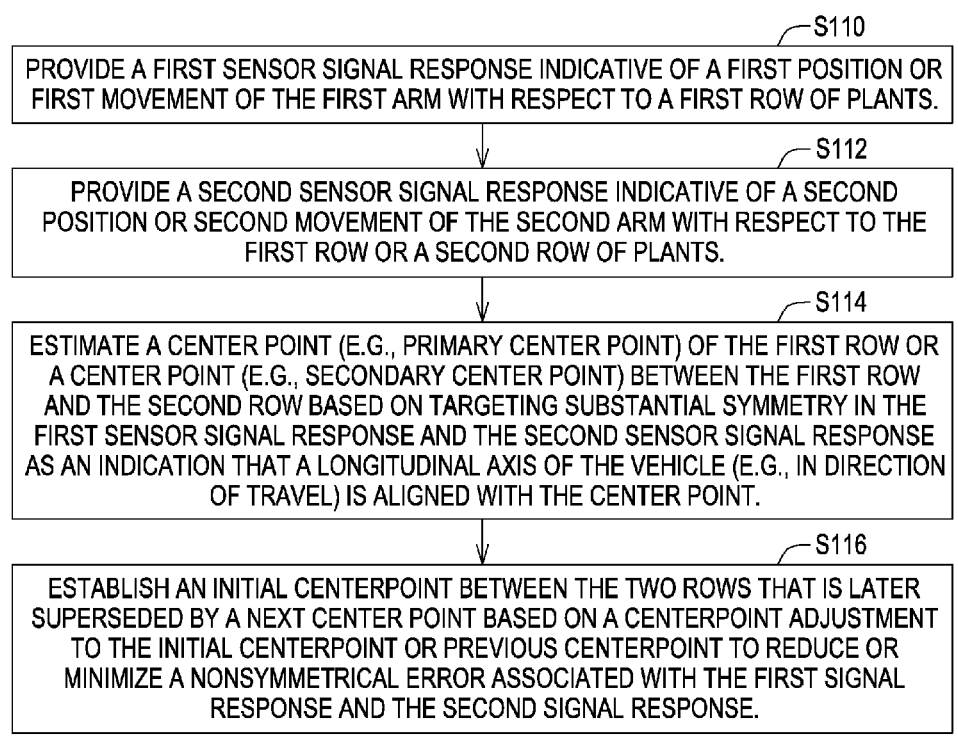
FIG. 9 is second embodiment of a method for sensing a position of a vehicle or guiding a vehicle with respect to one or more plant rows.
Figure 10:
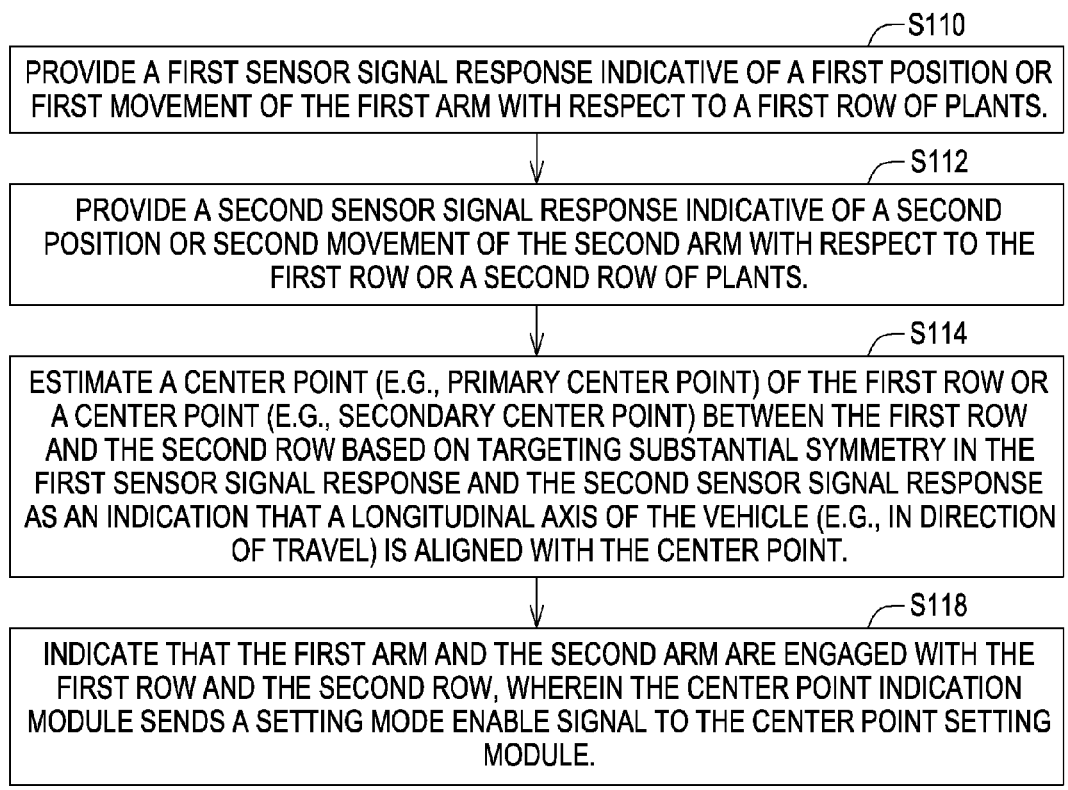
FIG. 10 is third embodiment of a method for sensing a position of a vehicle or guiding a vehicle with respect to one or more plant rows.

The method of FIG. 10 is similar to the method of FIG. 8, except the method of FIG. 9 further comprises step S118. Like reference numbers in FIG. 8 and FIG. 10 indicate like steps or procedures.

In step S118, the data processor 120, display 146 or both indicate that the first arm 164 and the second arm 264 are engaged with the first row and the first row, or with the first row and the second row, respectively, wherein the center point indication module 130 sends a second mode enable signal to the center point setting module 128.

Figure 11:
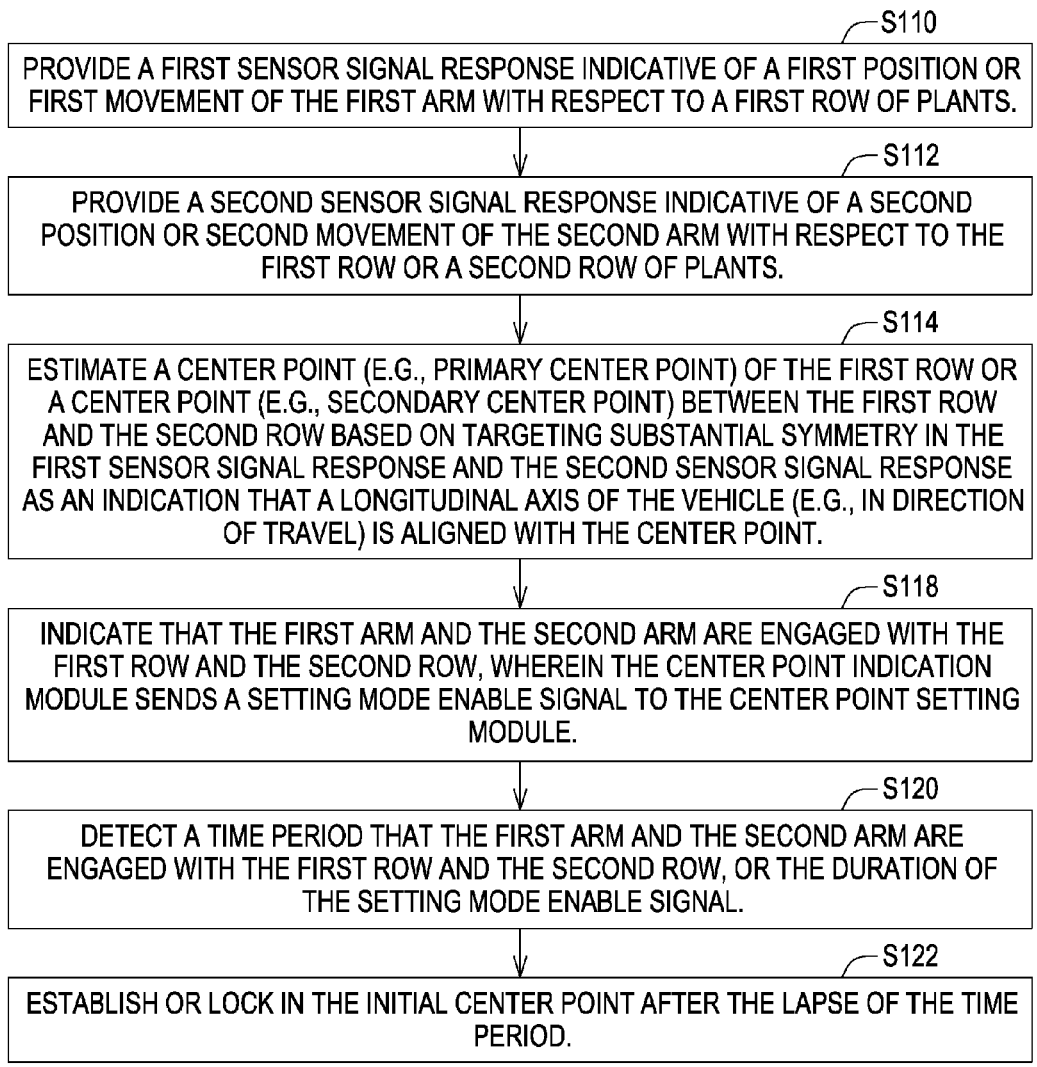
FIG. 11 is fourth embodiment of a method for sensing a position of a vehicle or guiding a vehicle with respect to one or more plant rows.

The method of FIG. 11 is similar to the method of FIG. 10, except the method of FIG. 11 further comprises steps S120 and S122. Like reference numbers in FIG. 10 and FIG. 11 indicate like steps or procedures.

In step S120, the data processor 120 detects a time period that the first arm 164 and the second arm 264 are engaged with the first row and the first row, or with the first row and the second row, respectively, or the duration of setting mode enable signal.

In step S122, the data processor 120 establishes or locks in the initial center point after the lapse of the time period.

Figure 12:
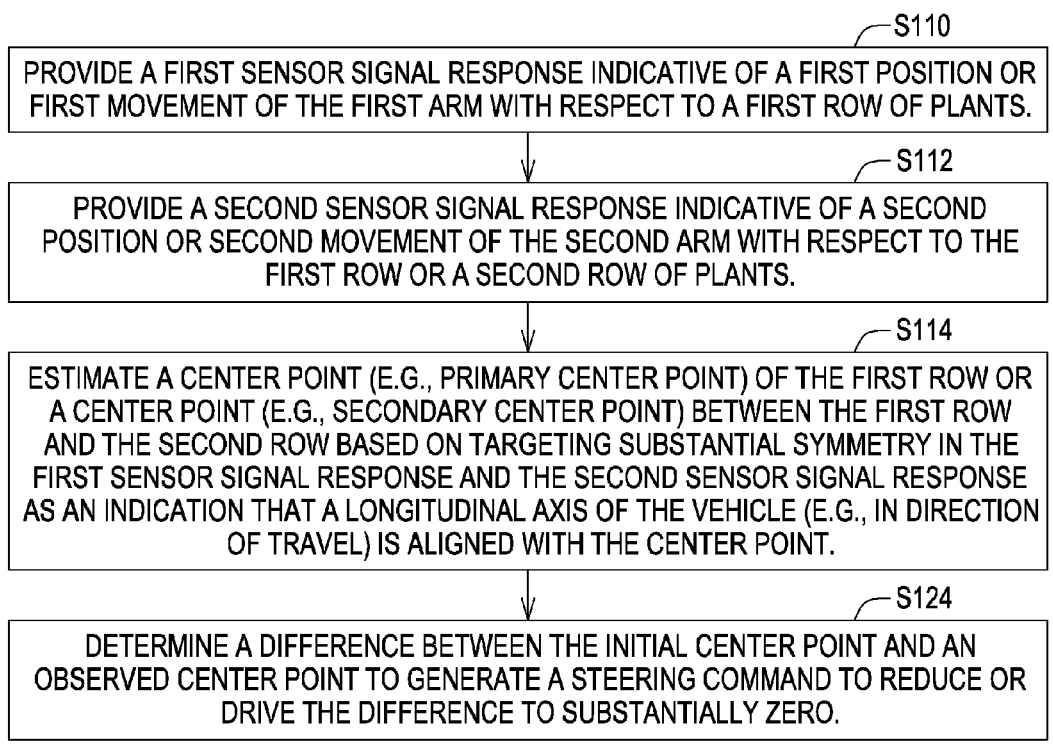
FIG. 12 is fifth embodiment of a method for sensing a position of a vehicle or guiding a vehicle with respect to one or more plant rows.

The method of FIG. 12 is similar to the method of FIG. 8, except the method of FIG. 12 further comprises step S124. Like reference numbers in FIG. 8 and FIG. 12 indicate like steps or procedures.

In step S124, the data processor 120 determines a difference between the initial center point and an observed center point to generate a steering command to reduce or drive the difference to substantially zero. In one embodiment, a center point limit module may be arranged or adapted to limit an adjustment to the initial center point to a maximum deviation or maximum limit per unit time.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A system for guiding a vehicle, the system comprising:
   a first arm for pivoting about a first pivot point associated with a vehicle, or its implement, in response to contact with a first row of plants;
   a first sensor associated with the first arm to provide a first sensor signal response indicative of a first position or first movement of the first arm with respect to the first row;
   a second arm for pivoting about a second pivot point associated with a vehicle, or its implement, in response to contact with the first row, or second row of plants spaced apart from the first row with a substantially parallel spacing;
   a second sensor associated with the second arm to provide a second sensor signal response indicative of a second position or second movement of the second arm with respect to the first row, or second row;
   a data processor for estimating an initial center point of the first row or between the first row and the second row based on targeting substantial symmetry in the first sensor signal response and the second sensor signal response as an indication that a longitudinal axis of the vehicle is aligned with the center point, where substantial symmetry is present if an error or difference between the first sensor signal response and the second sensor signal response is less than a threshold;
   a center point indication module for indicating that the first arm and the second arm are engaged with the first row or with the first row and the second row, wherein the center point indication module sends a setting mode enable signal to the center point setting module or the data processor;
   a timer for detecting a time period that the first arm and the second arm are engaged with the first row or the first row and the second row, or the duration of the setting mode enable signal; and
   the center point setting module that establishes or locks in the initial center point after the lapse of the time period.

2. The system according to claim 1 wherein the substantial symmetry is based on a voltage or current amplitude of the signal responses within a first range of each other.

3. The system according to claim 2 wherein the substantial symmetry is based on a frequency of the signal responses within a second range of each other.

4. The system according to claim 1 further comprising:
   a center point setting module for an operator to establish the initial center point between the two rows that is later superseded by a next center point based on a center point adjustment to the initial center point or previous center point to reduce or minimize a nonsymmetrical error associated with the first signal response and the second signal response.

5. The system according to claim 1 further comprising:
   a tracking module for determining a difference between the initial center point and an observed center point to generate a steering command to reduce or drive the difference to substantially zero.

6. The system according to claim 1 further comprising:
   a center point limit module for limiting an adjustment to the initial center point to a maximum deviation or maximum limit per unit time.

7. The system according to claim 1 further comprising the substantial similarly determined based on a difference between the first sensor signal response and the second sensor signal response, wherein the difference exceeds a threshold.

8. A method for guiding a vehicle, the method comprising:
   providing a first sensor signal response indicative of a first position or first movement of the first arm with respect to the first row;
   providing a second sensor signal response indicative of a second position or second movement of the second arm with respect to the first row, or second row;
   estimating a center point between the first row and the first row, or second row based on targeting substantial symmetry in the first sensor signal response and the second sensor signal response as an indication that a longitudinal axis of the vehicle is aligned with the center point, where substantial symmetry is present if an error or difference between the first sensor signal response and the second sensor signal response is less than a threshold;
   indicating that the first arm and the second arm are engaged with the first row or with the first row and the second row and sending a setting mode enable signal;
   detecting a time period that the first arm and the second arm are engaged with the first row or the first row and the second row, or the duration of the setting mode enable signal; and
   establishing or locking in the center point after the lapse of the time period.

9. The method according to claim 8 wherein the substantial symmetry is based on a voltage or current amplitude of the signal responses within a first range of each other.

10. The method according to claim 8 wherein the substantial symmetry is based on a frequency of the signal responses within a second range of each other.

11. The method according to claim 8 further comprising:
    establishing an initial center point between the two rows that is later superseded by a next center point based on a center point adjustment to the initial center point or previous center point to reduce or minimize a nonsymmetrical error associated with the first signal response and the second signal response.

12. The method according to claim 8 further comprising:
    indicating on a display that the first arm and the second arm are engaged with the first row or with the first row and the second row.

13. The method according to claim 8 further comprising:
    determining a difference between the initial center point and an observed center point to generate a steering command to reduce or drive the difference to substantially zero.

14. The method according to claim 8 further comprising:
    limiting an adjustment to the initial center point to a maximum deviation or maximum limit per unit time.

15. The method according to claim 8 further comprising the substantial similarly determined based on a difference between the first sensor signal response and the second sensor signal response, wherein the difference exceeds a threshold to indicate a longitudinal axis of the vehicle is not aligned with the center point.

16. The system according to claim 1 wherein the substantial symmetry is based on a Fourier transform to transform a time domain representation of the first sensor signal response and the second sensor signal response to a frequency domain response.

17. The method according to claim 8 wherein the substantial symmetry is based on a Fourier transform to transform a time domain representation of the first sensor signal response and the second sensor signal response to a frequency domain response.

18. A system for guiding a vehicle, the system comprising:
- a first arm for pivoting about a first pivot point associated with a vehicle, or its implement, in response to contact with a first row of plants;
- a first sensor associated with the first arm to provide a first sensor signal response indicative of a first position or first movement of the first arm with respect to the first row;
- a second arm for pivoting about a second pivot point associated with a vehicle, or its implement, in response to contact with the first row, or second row of plants spaced apart from the first row with a substantially parallel spacing;
- a second sensor associated with the second arm to provide a second sensor signal response indicative of a second position or second movement of the second arm with respect to the first row, or second row;
- a data processor for estimating an initial center point of the first row or between the first row and second row based on targeting substantial symmetry in the first sensor signal response and the second sensor signal response as an indication that a longitudinal axis of the vehicle is aligned with the center point where substantial symmetry is present if an error or difference between the first sensor signal response and the second sensor signal response is less than a threshold; and
- a center point limit module for limiting an adjustment to the initial center point to a maximum deviation or maximum limit per unit time.

* * * * *